(12) United States Patent
Song (10) Patent No.: US 9,210,112 B2
(45) Date of Patent: Dec. 8, 2015

(54) METHOD FOR PROVIDING A SOCIAL NETWORKING SERVICE AND SERVICE PROVIDING SERVER APPLYING THE SAME

(75) Inventor: Mee-sun Song, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 701 days.

(21) Appl. No.: 13/107,134

(22) Filed: May 13, 2011

(65) Prior Publication Data

US 2011/0282952 A1 Nov. 17, 2011

Related U.S. Application Data

(60) Provisional application No. 61/334,231, filed on May 13, 2010, provisional application No. 61/334,618, filed on May 14, 2010.

(30) Foreign Application Priority Data

Apr. 26, 2011 (KR) .......................... 10-2011-0039169

(51) Int. Cl.
*G06F 7/08* (2006.01)
*H04L 12/58* (2006.01)
*G06Q 10/10* (2012.01)
*G06Q 50/00* (2012.01)

(52) U.S. Cl.
CPC ................. *H04L 51/16* (2013.01); *G06Q 10/10* (2013.01); *G06Q 50/01* (2013.01); *H04L 51/32* (2013.01)

(58) Field of Classification Search
CPC ................................. H04L 51/32; H04L 51/16
USPC ....................................... 709/205, 206; 705/319
See application file for complete search history.

(56) References Cited

U.S. PATENT DOCUMENTS

| | | | |
|---|---|---|---|
| 6,832,245 B1 * | 12/2004 | Isaacs et al. | 709/206 |
| 7,243,125 B2 * | 7/2007 | Newman et al. | 709/206 |
| 7,844,671 B1 * | 11/2010 | Lawler et al. | 709/206 |
| 8,055,715 B2 * | 11/2011 | Bensky et al. | 709/206 |
| 8,341,232 B2 * | 12/2012 | Rashad et al. | 709/206 |
| 8,375,097 B2 * | 2/2013 | Lawler et al. | 709/206 |
| 8,402,094 B2 * | 3/2013 | Bosworth et al. | 709/206 |
| 8,903,921 B1 * | 12/2014 | Snow et al. | 709/206 |
| 2006/0080284 A1 * | 4/2006 | Masonis et al. | 707/3 |
| 2006/0143066 A1 * | 6/2006 | Calabria | 705/10 |
| 2008/0021729 A1 * | 1/2008 | Calabria | 705/1 |
| 2009/0119173 A1 * | 5/2009 | Parsons et al. | 705/14 |

* cited by examiner

*Primary Examiner* — Aaron Strange
(74) *Attorney, Agent, or Firm* — Cha & Reiter, LLC (57) ABSTRACT

A method for providing a social networking service (SNS) preferably includes receiving an input of an original text and a comment on the original text according to execution of a SNS program, dividing the original text and the comment into a plurality of threads according to a preset criterion, analyzing relationships between users who write the original text and/or the comment included in the plurality of threads, and categorizing the users according to a result of the analysis.

18 Claims, 5 Drawing Sheets

METHOD FOR PROVIDING A SOCIAL NETWORKING SERVICE AND SERVICE PROVIDING SERVER APPLYING THE SAME

CLAIM OF PRIORITY

This application claims the benefit of priority under 35 U.S.C. §119 from U.S. Provisional Application No. 61/334,231, filed on May 13, 2010, and U.S. Provisional Application No. 61/334,618, filed on May 14, 2010, and Korean Patent Application No. 10-2011-0039169, filed on Apr. 26, 2011, in the Korean Intellectual Property Office, the disclosures of all are incorporated herein by reference in their entirety.

BACKGROUND OF THE INVENTION

1. Field of the Invention

The present invention relates to methods and servers consistent with the disclosure provided herein relate to providing a social networking service. More particularly, the present invention relates to a method for providing social networking service to enable various social relations to be built among people on the worldwide web (i.e. Internet) and a service providing server applying the same.

2. Description of the Related Art

Social networking services such as blogs, chat rooms, online communities, social networking sites, etc. are dominating the web. Among these, the social media and social networking services including personal blogs, on-line communities, Facebook, Twitter, Witty are Web 2.0 main stream services.

With regard to the development of the social networking service, much research has been conducted to study potential social relations among users based on the links among the users such as citations, trackbacks or comments.

Two of these research efforts will be explained below. One research study is about user discovery (Shin, Xu, and Kim 2008; Nauerz and Groh 2007; Java et al. 2006; Agarwal et al. 2008; Java et al. 2006) (hereafter "Shin"), and the other research study is about social network construction (Furukawa, Matsue, and Ohmukai 2007; Karamon, Matsuo, and Ishizuka 2008; Lin et al. 2006; Nauerz and Groh 2007) (hereafter "Furukawa").

Shin applies an approach to analyze and focus on connections and behaviors of the most-influential users on community or blog spheres, and Furukawa applies an approach to focus on a method for users to discover social networks.

As explained above, most research as a pre-condition is based on unilateral relations between users who make comments and users who post original texts. However, the above approach overlooks the fact that users often write arguments or comments within a comment thread many times, while those who post main texts are not included in the current comment thread context. In other words, while there are rather complicated relations among users who write comments and users who post original texts or users who comment on other comments, these are generally limited to unilateral connection. Accordingly, there is a need in the art to address the above-mentioned problems and extract potential social relations of the users.

SUMMARY OF THE INVENTION

The present invention overcomes both the above disadvantages and other disadvantages not discussed herein above. Also, the present invention also provides advantages discussed herein.

According to one exemplary embodiment, the present invention provides a method for providing services which is capable of analyzing texts written on a social networking service, and determine social relations including level of intimacy among the users who write the texts and a service providing server applying the same.

In one exemplary embodiment, a method for providing a social networking service (SNS) may preferably include receiving an input of an original text and a comment on the original text according to execution of a SNS program, dividing the original text and the comment into a plurality of threads according to a preset criterion, analyzing relationships between users who write the original text and/or the comment included in the plurality of threads, and categorizing the users according to a result of the analysis.

The method may additionally include selectively providing an access to view according to the result of user categorization.

The method may also additionally include selectively providing related content or recommended ID according to the result of user categorization.

The dividing of the original text and the comment into a plurality of threads according to a preset criterion can be performed in a various number of ways within the spirit and scope of the claimed invention, as disclosed in the following examples.

The dividing may include dividing the original text and the comment into the plurality of threads based on a preset time unit with reference to time at which the original text and the comment are written.

The dividing may include dividing a preset number of the original text and the comment into the plurality of threads.

The dividing may include dividing a preset number of the original text and the comment into the plurality of threads, in which a preset number of texts among the original text and/or the comment included in each thread overlap with those of the previous thread.

The dividing may include dividing a preset number of the original text and the comment into the plurality of threads, in which each of the plurality of threads includes the original text.

In addition, the analyzing of relationships between users who write the original text and/or the comment included in the plurality of threads may include determining a level of intimacy of the users based on at least one of: frequency of writing, number of texts, length of texts, time interval between writing, and semantic of texts in each thread.

The analyzing may include providing a weight based on at least one of: frequency of writing, number of texts, length of texts, time interval between writing, and semantic of texts in each thread, computing harmonic mean with respect to each weight, and determining intimacy levels of the users based on a result of computation.

In one exemplary embodiment, a service providing server for providing a social networking service (SNS) may be provided, which may include an input unit which receives an input of an original text and a comment on the original text according to execution of a SNS program, and a control unit (i.e. processor or microprocessor) which divides the original text and the comment into a plurality of threads according to a preset criterion, analyzes relationships between users who write the original text and/or the comment included in the plurality of threads, and categorizes the users according to a result of the analysis.

The control unit may selectively provide an access to view according to the result of user categorization.

The control unit may selectively provide related content or recommended ID according to the result of user categorization.

The control unit may divide the original text and the comment into the plurality of threads based on a preset time unit with reference to time at which the original text and the comment are written.

The control unit may divide a preset number of the original text and the comment into the plurality of threads.

The control unit may divide a preset number of the original text and the comment into the plurality of threads, in which a preset number of texts among the original text and/or the comment included in each thread overlap with those of the previous thread.

The control unit may divide a preset number of the original text and the comment into the plurality of threads, in which each of the plurality of threads includes the original text.

The control unit may determine a level of intimacy of the users based on at least one of: frequency of writing, number of texts, length of texts, time interval between writing, and semantic of texts in each thread.

The control unit may provide a weight based on at least one of: frequency of writing, number of texts, length of texts, time interval between writing, and semantic of texts in each thread, compute harmonic mean with respect to each weight, and determine intimacy levels of the users based on a result of computation.

According to various exemplary embodiments, since the intimacy levels of the users who write original text and/or comments on the social networking service can be analyzed regardless of whether the users write original text or comments, more meaningful information can be provided to the users based on their intimacy levels. In another exemplary embodiment, a method for providing a social networking service (SNS), comprising receiving by an input unit of a computer server an original text and one or more comments regarding the original text according to execution of a SNS program; dividing by a control unit of the computer server the original text and the one or more comments into a plurality of threads according to a preset criterion; analyzing by the control unit relationships between users who wrote the original text received by the input unit and/or the one or more comments included in the plurality of threads; and categorizing by the control unit the users according to a result of the analysis; and outputting the result of user categorization to storage for the server to use in a subsequent access request to determine a view of the plurality of threads of original text and the one or more comments.

BRIEF DESCRIPTION OF THE DRAWINGS

The above and/or other aspects of the present invention will become more apparent to a person of ordinary skill in the art by describing certain exemplary embodiments of the present invention with reference to the accompanying drawings, in which.

DETAILED DESCRIPTION

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present invention. Accordingly, it is apparent that the exemplary embodiments of the present invention can be carried out without those specifically defined matters. Also, well-known functions or constructions are not described in detail since they would obscure the invention with unnecessary detail.

Figure 1:
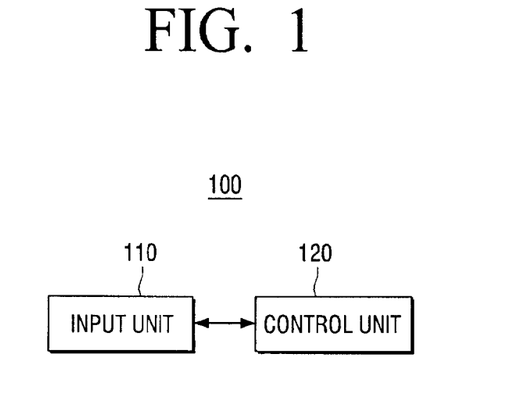
FIG. 1 is a block diagram of a service providing server according to an exemplary embodiment.

FIG. 1 is a block diagram of a service providing server according to an exemplary embodiment of the present invention.

Referring now to FIG. 1, a service providing server 100 may be implemented to provide a social networking service. The server preferably comprises a hardware device with a processor or microprocessor, firmware, etc.

First, the general concept of a social networking service will be explained briefly below for better understanding of the exemplary embodiment.

The social networking service (SNS) is a web based service which enables users to maintain their social relations more firmly with friends, acquaintances, workmates, etc., and also create new contacts and thus expand to a wider social network (i.e., social relations).

As the people's desire to express themselves increases, social networking services have also been developed as these provide means to create and maintain social relations among people. The social networking service is different from the conventional web based online community services such as cafes, clubs, etc. where groups with specific interest share exclusive services among themselves, since the social networking service enable each user to be the center and share his own interest and distinct individuality with others. These social networking services mainly include Twitter, Facebook, Myspace, Linkedin, BEBO, H15•XING, Cyworld, etc.

The service providing server 100 according to an exemplary embodiment divides original text and comments made with respect to the original text according to SNS program to provide social networking service under a plurality of message threads (shortly, 'thread'), and analyze and accordingly categorizes users who write the original text and/or comments according to the their relationships with each other.

More specifically, the service providing server 100 may divide one threads including the original text and comments thereon into a plurality of threads, and determine level of intimacy among users who write the text and/or comments based on at least one of: frequencies of writing, number of texts, length of texts, time interval between writing, and semantics of texts, and gives selective access to view, or recommends related contents or IDs to the users with higher level of intimacy.

Referring now to FIG. 1, the service providing server 100 may include an input unit 110 and a control unit 120.

The input unit 110 may receive original text and/or comment according to execution of an SNS program. More specifically, the input unit 110 may receive an input message which is written on a specific webpage of the social networking service, and preferably includes operational buttons including alphanumerical buttons/keys or virtual keys via touchscreen to permit input to be provided.

Herein, the message written firstly on the webpage is 'original text', and the messages sequentially written following the original text are 'comments (or responses)'. The comments may be written with respect to not only the original text, but also the other comments.

The control unit 120 divides the original text and comments into a plurality of threads based on predetermined criterion. The 'thread' herein refers to a group of original texts, comments written in response to the corresponding original texts, and comments written in response to the other comments. In other words, the control unit 120 may divide one thread including original text and comments into a plurality of threads based on various methods. For example, a sliding window may be implemented to divide one thread into a plurality of threads. The sliding window herein refers to a window of a preset size which is slid sequentially to divide one thread into a plurality of threads. In another example, a window with a preset size may be matched to one thread including original text and comments written therein in order, and slid so that the thread is divided into a plurality of threads corresponding to the respective sliding windows.

Meanwhile, regardless of the distance therebetween, most comments are highly likely to be related to the original text, while, if the window is slid sequentially, the original text may be included in the first window, in which case the original text may be added to the respective threads divided by the respective sliding windows.

More specifically, the control unit 120 may divide the time of inputting original text and comments based on a preset time unit, or group the original text and comments by predetermined numbers, to divide one thread into a plurality of threads.

For example, it is assumed that the original text is written on a specific webpage at 10:00, and five comments are written on the original text at 10 minute intervals between 10:00 and 10:50. The comments may comprise items that are written in response to the original text or to the comments to the original text.

If the preset unit time is, for example, 25 minutes, the control unit 120 may divide the original text and comments into a thread for texts written between 10:00 and 10:25, and another thread for texts written between 10:25 and 10:50. Accordingly, the control unit 120 may control so that the texts written during a predetermined time period are included in one thread.

Meanwhile, if the preset number of texts is 2, the control unit 120 may control so that one thread is divided into threads each including two texts therein. Therefore, in the particular example explained above, the thread may be divided into a thread for the original text written at 10:00 and comment written at 10:10, another thread for comments written at 10:20 and 10:30, and yet another thread for comments written at 10:40 and 10:50. That is, the control unit 120 may control so that the divided threads each include the same number of texts therein.

In the case of grouping a preset number of original text and comments into a plurality of threads, the control unit 120 may, for example, divide one thread so that some of the texts included in each divided thread overlap with those of the previous threads, or the plurality of threads each include the original text. The method for dividing threads will be explained in greater detail below with reference to FIGS. 2A to 2C.

Figure 2A:
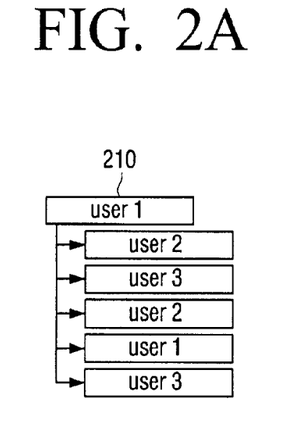
FIGS. 2A to 2C are views provided to illustrate an example of a method for dividing one thread into a plurality of threads, according to an exemplary embodiment.
Figure 2B:
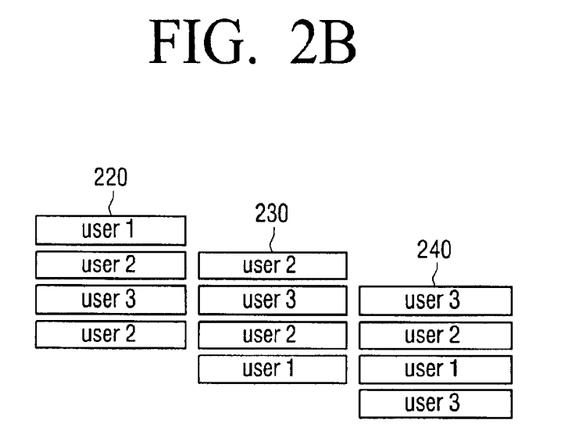
Figure 2C:
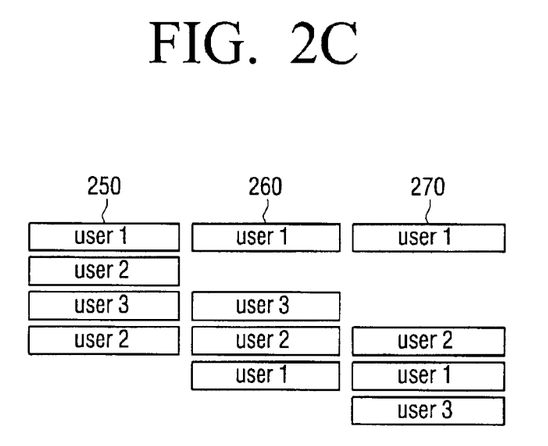

FIGS. 2A to 2C are views provided to illustrate a method for dividing the thread 210 of FIG. 2A into a plurality of threads.

FIG. 2B particularly illustrates an example of grouping a preset number of original text and comments into a plurality of threads, in which some of the preset number of text in each thread overlap with those of the previous threads.

Still referring to FIG. 2B, one thread (210 in FIG. 2A) is divided into three threads 220, 230, 240, with each thread including four texts and three of these overlap with those of the previous threads. The texts overlapping with those of the previous threads are determined in the order of time these are inputted.

Meanwhile, FIG. 2C illustrates an example of grouping a preset number of original text and comments into a plurality of threads, in which each of the threads includes the original text.

Referring now to FIG. 2C, each thread 250, 260, 270 includes four texts including the original text therein. Again, the texts of each thread 250, 260, 270 except the original text are determined in the order these are inputted, and some of the texts may overlap with those included in the previous threads.

Meanwhile, as explained in the exemplary embodiment explained above, in dividing one thread into a plurality of threads each including a preset number of original text and comments, a certain number of texts may overlap with those of the previous thread or each thread may include the original text therein. However, this example is provided only for illustrative purposes and other variations within the spirit of the invention and the scope of the appended claims can be realized. For example, the original text and comments may be divided based on a preset time unit and grouped into a plurality of threads.

The control unit 120 preferably analyzes the relations among the users writing the texts of the plurality of threads, and categorize the users based on the analysis.

The control unit 120 outputs the result of user categorization to storage for the server to use in a subsequent access request to determine a view of the plurality of threads of original text and the one or more comments.

In other words, the control unit 120 may determine level of intimacy among users writing the texts, based on at least one of: frequency of writing, number of texts, length of texts, time interval between writing, and semantics of texts.

For example, if the frequency of writing is applied, the control unit 120 may detect the users writing the texts in each thread, and determine the frequency of writing by each user in each thread to determine level of intimacy of the users. This will be explained in greater detail with reference to FIGS. 3A and 3B.

Figure 3A:
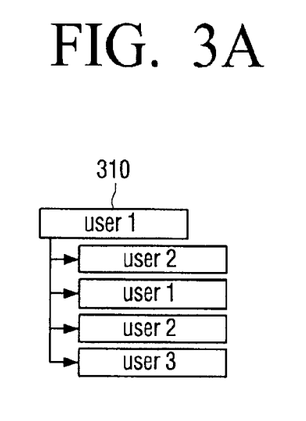
FIGS. 3A and 3B are views provided to illustrate a method for determining level of intimacy among users depending on their frequencies of writing, according to an exemplary embodiment.
Figure 3B:
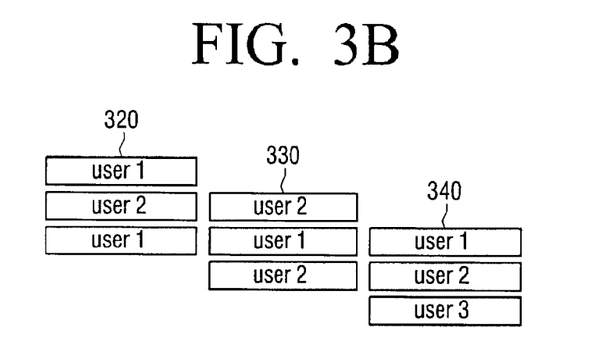

FIGS. 3A and 3B are views provided to illustrate a method for determining level of intimacy among users according to the frequency of their writing. FIG. 3A particularly illustrates an example of a thread 310 (i.e., one thread) in which user 1 inputs original text, and the related comments are inputted in the order of: user 2, user 1, user 2, and user 3. FIG. 3B illustrates an example where the thread 310 of FIG. 3A is divided into a plurality of threads 320, 330, 340.

The control unit 120 detects the users who write the texts in each of the plurality of threads. The 'users who write the texts' herein may refer to all or part of the users writing the texts included in a specific thread, depending on the number of users targeted for intimacy level analysis.

Accordingly, referring now to FIG. 3B, in order to determine the level of intimacy between two users, the control unit 120 may detect user 1-user 2 in the thread 320, detect user 1-user 2 in the thread 330, and detect user 1-user 2, user 1-user 3 and user 2-user 3 in the thread 340.

The control unit 120 may then determine the frequency of detecting the users who write texts in each thread, to thus determine the level of intimacy of the users. Referring to FIG. 3B, it is detected that user 1-user 2 write texts together in all the threads 320, 330, 340, and user 1-user 3 and user 2-user 3 write texts together in only one thread 340. Accordingly, the control unit 120 determines that user 1-user 2, detected as writing texts together in the highest number of threads, to have the highest level of intimacy, while determining user 1-user 3, and user 2-user 3 to have lower level of intimacy.

Meanwhile, the level of intimacy among users may also be determined based on other factors, such as number of texts, length of texts, time interval between writing texts, or semantics of texts, in which case the control unit 120 may apply a weight based on at least one of the number of texts, length of texts, time interval between writing texts, and semantics of texts, and compute harmonic means with respect to the respective weights.

More specifically, the control unit 120 may apply a weight to a user who writes a corresponding text in each thread, according to at least one of the number of texts, length of texts, time interval between writing texts, and semantics of texts, and compute a harmonic mean with respect to the weight corresponding to a predetermined user group to compute relation scores among the users of the corresponding user group. The predetermined user group may include all or part of the users who write the texts included in each thread. Further, the relation score may refer to a parameter in a score form to determine the level of intimacy among users.

The control unit 120 may also compute the harmonic mean of the relation scores of the specific user group as computed with respect to each thread, to compute the level of intimacy among users in the corresponding user group.

The above will be explained in greater detail below with reference to FIGS. 4A and 4B.

Figure 4A:
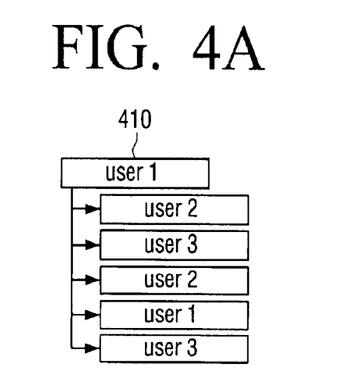
FIGS. 4A and 4B are views provided to illustrate a method for determining level of intimacy among users based on values computed by applying a weight based on the number of writing, according to an exemplary embodiment.
Figure 4B:
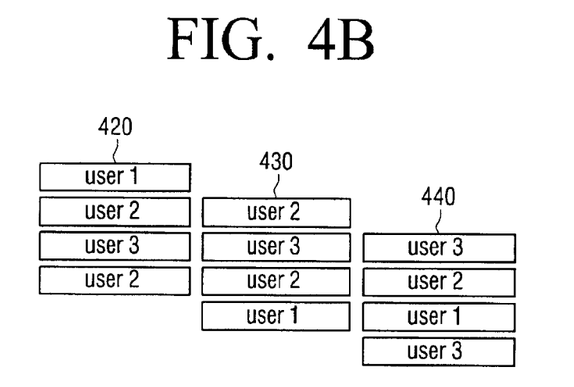

FIGS. 4A and 4B are views provided to illustrate a method for determining a level of intimacy among users based on a value computed by applying a weight based on the number of texts. FIG. 4A particularly illustrates a thread 410 (i.e., one thread) in which original text is written by user 1, and comments are written by user 2, user 3, user 2, user 1 and user 3 in order. FIG. 4B illustrates an example in which the thread 410 is divided into a plurality of threads 420, 430, 440.

The control unit 120 applies a weight to a user who writes a corresponding text, according to the number of texts included in each thread. To be specific, referring to FIG. 4B, user 2 wrote highest number of texts (i.e., two texts) in the thread 420, and user 1 and user 3 each wrote one, which is lower than those by user 2. Accordingly, the control unit 120 applies the highest weight to user 2 in proportion to the number of texts, and applies lower weight to user 1 and user 3. For explanatory purposes, it is assumed hereinbelow that the weights applied to the user correspond to the number of texts he/she writes. That is, weights 2 are applied to user 2, and weight 1 is applied to user 1 and user 3, respectively.

In the manner explained above, in proportion to the number of texts that a user writes, the control unit 120 may apply weight 1 to user 1 and user 3, and apply weights 2 to user 2 in the thread 430, and apply weight 1 to user 1 and user 2 and weights 2 to user 3 in the thread 440.

Subsequent to applying weights, the control unit 120 computes harmonic mean with respect to the weights corresponding to the specific user group in each thread, and computes relation scores of the users in the corresponding user group. For example, in order to determine the level of intimacy between two users, the control unit 120 computes the harmonic mean with respect to the weight applied to the two different users, and computes relation scores of the users in the corresponding user group. The relation scores may be computed by:

$$\text{Score}_{u_1 u_2}(T_1) = H(W(u_1), W(u_2)) \quad \text{[Mathematical expression 1]}$$
$$= \frac{2*W(u_1)*W(u_2)}{W(u_1)+W(u_2)}$$

where, $\text{Score}_{u_1,u_2}(T_1)$ denotes relation score in the first thread (T1), $H(\bullet)$ denotes harmonic mean. W denotes weight applied to user, $W(u_1)$ is weight applied to user 1, and $W(u_2)$ is weight applied to user 2.

Accordingly, the group of users who write texts in (i)th thread corresponds to $T_i$. Further, weight $W(u_j)$ is applied to user j who writes the text included in (i)th thread, and the group of weights applied to the respective users who write texts included in (i)th thread corresponds to $W_i$. This can be expressed by:

$$T_i = \{u_1, u_2 \ldots\} \quad \text{[Mathematical expression 2]}$$

$$W_i = \{W(u_j) | \forall u_j \in T_i\}, \quad \text{[Mathematical expression 3]}$$

Meanwhile, if relation scores of the corresponding user group are computed in another thread using the mathematical expression 1, with respect to the thread 420, user 1-user 2 is 4/3, user 1-user 3 is 1, and user 2-user 3 is 4/3. With respect to the thread 430, user 1-user 2 is 4/3, user 1-user 3 is 1, and user 2-user 3 is 4/3. With respect to the thread 440, user 1-user 2 is 1, user 1-user 3 is 4/3, and user 2-user 3 is 4/3.

The control unit 120 may also compute the harmonic mean of the relation scores of a specific user group computed with respect to each thread, to compute total score with respect to the corresponding user group as follows:

[Mathematical expression 4]
$$\text{TotalScore}_{u_1 u_2} = H(\text{Score}_{u_1 u_2}(T_1), \ldots, \text{Score}_{u_1 u_2}(T_m)) * m$$
$$= \frac{m}{\sum_{i=1}^{m} \frac{1}{\text{Score}_{u_1 u_2}(T_i)}} * m,$$

where, m denotes the number of threads to which the corresponding user group belongs. The number of threads to which corresponding user group belongs is taken into consideration, since the plurality of threads is originated from one thread.

Meanwhile, referring to FIG. 4B, there are three threads (that is, all the threads 420, 430, 440) to which user 1-user 2, user 1-user 3 and user 2-user 3 belong.

By computing the total score of the corresponding user group using mathematical expression 4, user 1-user 2 is 36/10 (=3.6), user 1-user 3 is 36/11(=3.27) and user 2-user 3 is 36/9(=4).

The control unit 120 may then analyze relations between users who write texts, using the total score computed with respect to each user group, and categorize the users based on the analysis. To be specific, the control unit 120 may determine the user group with highest total scores to have the highest level of intimacy, and accordingly categorize the users. For example, referring to FIG. 4B, the control unit 120 may categorize the users in the order of user 2-user 3, user 1-user 2, user 1-user 3 based on the level of intimacy.

The control unit 120 outputs the result of user categorization to storage for the server to use in a subsequent access request to determine a view of the plurality of threads of original text and the one or more comments.

Meanwhile, although a method for determining the level of intimacy among users was explained above to be based on values which are computed by applying weights based on the number of texts, this example is only provided for illustrative purposes. Accordingly, the same technical concept of the embodiment is applicable to other examples where, for example, length of text, time interval between writing texts, semantics of texts, etc. are used.

By way of example, it is possible to determine the level of intimacy among users based on values computed by weighing the length of texts. More specifically, the control unit 120 may compute the total length (e.g., sum of characters) of text of each user in each thread, and apply a weight to the users in the order of higher weight.

By way of another example, it is possible to determine the level of intimacy among users based on values computed by weighing the time interval between writing texts. More specifically, the control unit 120 may apply weights to the users in consideration of the time interval between writing texts by each user.

For example, it is assumed that user 1 writes text at 10:05, user 2 writes text at 10:07, user 3 writes text at 10:20, and user 1 again writes text at 10:25. Since user 2 writes text 2 minutes after the previous text is written (at 10:05 by user 1), user 3 writes text 13 minutes after the previous text is written (at 10:07 by user 2), and user 1 writes text 5 minutes after the previous text is written (at 10:20 by user 3), the control unit may give higher weights to users in the order of user 2, user 1 and user 3 according to shorter intervals of writing to the previous texts. It is also possible to give weight by considering the time of writing text by each user.

If semantic evaluation of the text is applied, the control unit 120 may give weights to the respective users by considering the word(s) or meaning of the text written by the users in each thread. For example, the control unit 120 may give a preset weight to the users who write the text including the same or similar word(s) in each thread. It is also possible the same words used over and over could be a blogger making a commercial post over and over, so there can also be a determination as to the type of semantics in that, for example, if a user keeps posting the same hyperlink, such repetition on a thread of comments could be spam.

Meanwhile, the control unit 120 may selectively allow access to users who are categorized according to their relationships.

More specifically, the control unit 120 may selectively allow access to the users if the users have a level of intimacy with a specific user beyond a preset level. For example, the control unit 120 may control a display unit (not illustrated) to display the texts written by the users with highest intimacy level with the specific user to appear larger than the texts of the others, or display only the texts written by the user with the highest intimacy level. Further, the categorized results can be stored in a storage medium for later retrieval and viewing.

Further, the control unit 120 may selectively provide the users categorized according to their relationships, with related content or recommended IDs.

More specifically, the control unit 120 may analyze the text written by the user who is determined to have more than a preset level of intimacy with the specific user, and provide related content according to the result of analysis. For example if the user having the highest level of intimacy with the specific user writes a text related to "movies", the control unit 120 may provide the user with "movies" content or information regarding "movies" content.

The control unit 120 may also recommend the specific user with an ID of a user having a preset level of intimacy with the specific user. For example, the specific user may be recommended with the ID of the user having the highest level of intimacy with him and can create a connection with the recommended user on the social networking service.

Although the exemplary embodiments explained above depict that the level of intimacy among the users is determined based on each of the number of texts, length of texts, time interval between writing texts, and semantics of the text, these examples are provided only for illustrative purpose and other modifications are possible and within the spirit and scoped of the presently claimed invention. For example, the level of intimacy among the users may be determined based on a combination of weights applied based on the number of texts, length of texts, time interval between writing texts, and semantic of texts.

Meanwhile, although the exemplary embodiments above were discussed herein above with reference to the social networking service, the SNS was provided for illustrative purposes. Accordingly, other examples are possible. For example, the exemplary embodiments may be applied to blogs, webs, etc.

Figure 5:
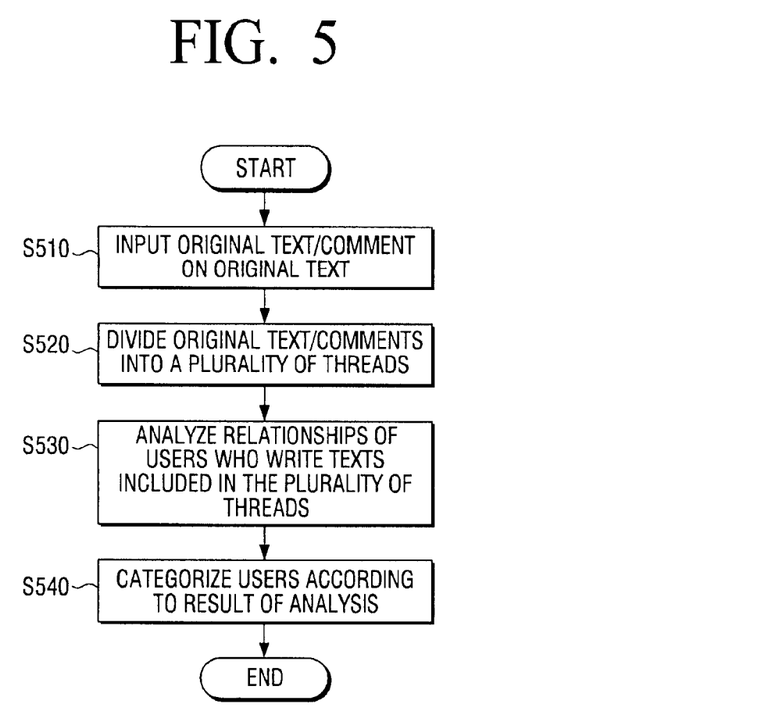
FIG. 5 is a flowchart provided to illustrate a method for providing social networking service according to an exemplary embodiment.

FIG. 5 is a flowchart provided to illustrate a method for providing a social networking service according to another exemplary embodiment of the presently claimed invention.

First, at S510, original text and related comments are written according to the execution of the social networking service program.

At S520, the original text and comments are divided into a plurality of threads based on preset criterion.

To be specific, the original text and comments may be divided into a plurality of threads based on preset time unit with reference to the time at which the original text and comments are written, or a preset number of original text and comments may be divided into a plurality of threads. In the above examples, a preset number of texts among the texts of each thread may overlap with those of the previous thread, or the plurality of threads may each include the original text.

At S530, the relationships of the users who write the texts included in the plurality of threads are analyzed.

To be specific, the level of intimacy between users may be determined based on at least one of: frequency of writing, number of texts, length of texts, time interval between writing, and semantic of texts in each thread.

If the 'frequency of writing' is applied, all the users who write texts in each thread are detected, and the level of intimacy among these users are determined based on the frequency of writing by each detected user. If other factors, such as, number of texts, length of texts, time interval between writing, and semantic of texts are applied, weight may be given based on at least one of the frequency of writing, number of texts, length of texts, time interval between writing, and semantic of texts, and then harmonic mean may be computed based on each weight to thereby determine the level of intimacy of the users based on the computed results.

At S540, the users are categorized according to the result of analysis.

According to the result of user categorization, users may be selectively provided with access to view, or related content or recommended IDs.

The methods explained above with reference to certain embodiments may be implemented on a service providing server, or alternatively, on other servers that do not include all the constituents of the service providing server explained above.

The above-described methods according to the present invention can be implemented in hardware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Further, in one exemplary embodiment of the present invention, a computer-readable recording medium containing therein a program to execute a method for displaying image explained above may be provided. The computer-readable recording medium may encompass all types of recording devices to store data to be read out by a computer system. The computer-readable recording medium may include, for example, ROM, RAM, CD-ROM, magnetic tape, floppy disk, or optical data storing device. Further, the computer-readable recording medium may be distributed over computer systems connected via a network so that computer-readable codes can be stored and executed in the distributed manner.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing a social networking service (SNS) by a computer server, comprising:
   receiving an original text and one or more comments regarding the original text;
   dividing the original text and the one or more comments into a plurality of threads according to a preset criterion;
   analyzing relationships between users who wrote the original text and/or the one or more comments included in the plurality of threads;
   categorizing the users according to a result of the analysis; and
   outputting a result of the categorization to storage for use in a subsequent request to determine a view of the plurality of threads of the original text and the one or more comments,
   wherein the analysis is performed based on length of at least some of the one or more comments, and
   wherein the dividing of the original text and the one or more comments into the plurality of threads comprises dividing a preset number of the original text and the one or more comments into the plurality of threads.

2. The method of claim 1, further comprising selectively providing an access to view the plurality of threads of the original text and the one or more comments according to the result of the categorization.

3. The method of claim 1, further comprising selectively providing related content or recommended ID according to the result of the categorization.

4. The method of claim 1, wherein the analyzing comprises determining a level of intimacy of the users based on at least one of: frequency of writing, number of texts, time interval between writing, and semantics of texts used in each thread.

5. The method of claim 1, wherein analyzing the relationships between users who wrote the original text and/or the one or more comments included in the plurality of threads comprises providing a weight based on at least one of: frequency of writing, number of texts, the length of at least some of the one or more comments, time interval between writing, and semantics of texts in each thread, computing a harmonic mean with respect to the weight, and determining intimacy levels of the users based on the harmonic mean.

6. The method of claim 5, wherein the weight is applied to two different users ($u_1$, $u_2$) and computing the harmonic mean comprises computing relation scores of a corresponding user group by:

$$\text{Score}_{u_1 u_2}(T_1) = H(W(u_1), W(u_2))$$
$$= \frac{2 * W(u_1) * W(u_2)}{W(u_1) + W(u_2)}$$

where, $\text{Score}_{u1,u2}(T_1)$ denotes a relation score in a first thread (T1), H denotes harmonic mean, W denotes weight applied to user, and $W(u_1)$ is weight applied to user $u_1$, and $W(u_2)$ is weight applied to user $u_2$.

7. A method for providing a social networking service (SNS), comprising:
   receiving, by a computer server an original text and one or more comments regarding the original text;
   dividing,. by a control unit of the computer server, the original text and the one or more comments into a plurality of threads according to a preset criterion;
   analyzing, by the control unit, relationships between users who wrote the original text and/or the one or more comments included in the plurality of threads;
   categorizing, by the control unit, the users according to a result of the analysis; and
   outputting a result of the categorization to storage for use in a subsequent request to determine a view of the plurality of threads of the original text and the one or more comments;
   wherein the dividing of the original text and the one or more comments into the plurality of threads comprises dividing a preset number of the original text and the one or more comments into the plurality of threads.

8. A method for providing a social networking service (SNS), comprising:
   receiving by a computer server, an original text and one or more comments regarding the original text;
   dividing, by a control unit of the computer server, the original text and the one or more comments into a plurality of threads according to a preset criterion;
   analyzing by the control unit, relationships between users who wrote at least one of the original text and the one or more comments included in the plurality of threads;
   categorizing by the control unit, the users according to a result of the analysis; and outputting a result of the categorization to storage for use in a subsequent request to determine a view of the plurality of threads of the original text and the one or more comments;

wherein the dividing comprises dividing a preset number of the original text and the one or more comments into the plurality of threads, wherein a preset number of texts among the original text and/or the one or more comments included in each thread overlap with those of a previous thread.

9. A method for providing a social networking service (SNS), comprising:

receiving, by a computer server, an original text and one or more comments regarding the original text;

dividing, by a control unit of the computer server, the original text and the one or more comments into a plurality of threads according to a preset criterion;

analyzing, by the control unit, relationships between users who wrote at least one of the original text and the one or more comments included in the plurality of threads;

categorizing, by the control unit, the users according to a result of the analysis; and outputting a result of the categorization to storage for use in a subsequent request to determine a view of the plurality of threads of the original text and the one or more comments, wherein the dividing comprises dividing a preset number of the original text and the one or more comments into the plurality of threads, and wherein each of the plurality of threads includes the original text.

10. A server for providing a social networking service (SNS), the server comprising:

an input unit which receives an original text and one or more comments regarding the original text; and a control unit which divides the original text and the one or more comments into a plurality of threads according to a preset criterion, analyzes relationships between users who wrote the original text and/or the one or more comments included in the plurality of threads, categorizes the users according to a result of the analysis, and stores a result of the categorization for use in a subsequent request to determine a view of the plurality of threads of the original text and the one or more comments, wherein the analysis is performed based on length of at least some of the one or more comments, and wherein the dividing of the original text and the one or more comments into the plurality of threads comprises dividing a preset number of the original text and the one or more comments into the plurality of threads.

11. The server of claim 10, wherein the control unit selectively provides an access to view the plurality of threads of the original text and the one or more comments according to the result of the categorization in response to the request.

12. The server of claim 10, wherein the control unit selectively provides related content or recommended ID according to the result of the categorization.

13. The server of claim 10, wherein the control unit determines a level of intimacy of the users based on at least one of: frequency of writing, number of texts, the length of at least some of the one or more comments, time interval between writing, and semantics of texts in each thread.

14. The server of claim 10, wherein the control unit provides a weight based on at least one of: frequency of writing, number of texts time interval between writing, and semantics of texts in each thread, computes harmonic mean with respect to each weight, and determines intimacy levels of the users based on the harmonic mean.

15. A server for providing a social networking service (SNS), the server comprising:

an input unit which receives an original text and one or more comments regarding the original text; and a control unit which divides the original text and the one or more comments into a plurality of threads according to a preset criterion, analyzes relationships between users who wrote the original text and/or the one or more comments included in the plurality of threads, categorizes the users according to a result of the analysis, and stores a result of the categorization for use in a subsequent request to determine a view of the plurality of threads of the original text and the one or more comments, wherein the control unit divides a preset number of the original text and the one or more comments into the plurality of threads.

16. A server for providing a social networking service (SNS), the server comprising:

an input unit which receives an original text and one or more comments regarding the original text; and a control unit which divides the original text and the one or more comments into a plurality of threads according to a preset criterion, analyzes relationships between users who wrote the original text and/or the one or more comments included in the plurality of threads, categorizes the users according to a result of the analysis, and stores a result of the categorization for use in a subsequent request to determine a view of the plurality of threads of the original text and the one or more comments, wherein the control unit divides a preset number of the original text and the one or more comments into the plurality of threads, and wherein a preset number of texts among the original text and/or the one or more comments included in each thread overlap with those of a previous thread.

17. A server for providing a social networking service (SNS), the server comprising:

an input unit which receives an original text and one or more comments regarding the original text; and a control unit which divides the original text and the one or more comments into a plurality of threads according to a preset criterion, analyzes relationships between users who wrote the original text and/or the one or more comments included in the plurality of threads, categorizes the users according to a result of the analysis, and stores the result of the categorization for use in a subsequent request to determine a view of the plurality of threads of the original text and the one or more comments, wherein the control unit divides a preset number of the original text and the one or more comments into the plurality of threads, wherein each of the plurality of threads includes the original text.

18. A non-transitory computer-readable medium comprising machine executable code which when executed by a processor causes the processor to perform the following steps:

receiving an original text and one or more comments regarding the original text;

dividing the original text and the one or more comments into a plurality of threads according to a preset criterion;

analyzing relationships between users who wrote the original text and/or the one or more comments included in the plurality of threads;

categorizing the users according to a result of the analysis; and outputting a result of the categorization to storage for use in a subsequent request to determine a view of the plurality of threads of the original text and the one or more comments wherein the analysis is performed based on length of at least some of the one or more comments, and wherein the dividing of the original text and the one or more comments into the plurality of threads comprises dividing a preset number of the original text and the one or more comments into the plurality of threads.

* * * * *

UNITED STATES PATENT AND TRADEMARK OFFICE
CERTIFICATE OF CORRECTION

| | | |
|---|---|---|
| PATENT NO. | : 9,210,112 B2 | Page 1 of 1 |
| APPLICATION NO. | : 13/107134 | |
| DATED | : December 8, 2015 | |
| INVENTOR(S) | : Mee-sun Song | |

It is certified that error appears in the above-identified patent and that said Letters Patent is hereby corrected as shown below:

IN THE CLAIMS

Column 12, Claim 7, Line 39 should read as follows:
--...server, an original text...--

Column 12, Claim 7, Line 41 should read as follows:
--...dividing, by a control...--

Column 12, Claim 8, Line 59 should read as follows:
--...receiving, by a computer...--

Column 12, Claim 8, Line 67 should read as follows:
--...categorizing, by the control...--

Column 13, Claim 8, Line 7 should read as follows:
--...threads, and wherein a...--

Column 15, Claim 18, Lines 3-5 should read as follows:
--...more comments, wherein the...--

Signed and Sealed this
Eighth Day of March, 2016

Michelle K. Lee
*Director of the United States Patent and Trademark Office*